United States Patent [19]

Woodson

[11] Patent Number: 4,969,324
[45] Date of Patent: Nov. 13, 1990

[54] CONTROL METHOD FOR USE WITH STEAM INJECTED GAS TURBINE

[75] Inventor: Carl W. Woodson, Ballston Lake, N.Y.

[73] Assignee: Gas Research Institute, Chicago, Ill.

[21] Appl. No.: 383,703

[22] Filed: Jul. 24, 1989

Related U.S. Application Data

[62] Division of Ser. No. 218,680, Jul. 13, 1988, Pat. No. 4,893,467.

[51] Int. Cl.$^5$ ............................................. F02C 3/30
[52] U.S. Cl. ................................................... 60/39.05
[58] Field of Search .................. 60/39.05, 39.3, 39.53, 60/39.55, 39.58, 39.54; 431/190

[56] References Cited

U.S. PATENT DOCUMENTS

| | | | |
|---|---|---|---|
| 2,959,005 | 11/1960 | Zaba | 60/39.55 |
| 3,359,723 | 12/1967 | Bohensky et al. | 60/39.05 |
| 3,693,347 | 9/1972 | Kydd et al. | 60/39.55 |
| 4,549,397 | 8/1985 | Cheng | 60/39.3 |
| 4,597,256 | 3/1986 | Hamill et al. | 60/39.05 |
| 4,660,376 | 4/1987 | Johnson | 60/39.05 |
| 4,680,927 | 10/1987 | Cheng | 60/39.3 |
| 4,735,043 | 11/1988 | Hamill et al. | 60/39.05 |

OTHER PUBLICATIONS

Day et al., *Maximum Steam Injection in Gas Turbines* General Electric Co., Schenectady, NY; 10/4/72.

*Primary Examiner*—Louis J. Casaregola
*Attorney, Agent, or Firm*—Wall and Roehrig

[57] ABSTRACT

A steam injection system for use in a gas turbine engine having a turbine coupled to an air compressor for providing air to the turbine combustor. Steam generated by a boiler or the like is treated by removing moisture and particulates from the steam supply and steam is then injected by a line into the combustion chamber. A control unit is arranged to sequence a series of valves so as to purge the line each time an injection cycle is started or ended. The valves can also be sequenced during an emergency shut down to prevent steam from flowing back through the compressor.

5 Claims, 1 Drawing Sheet

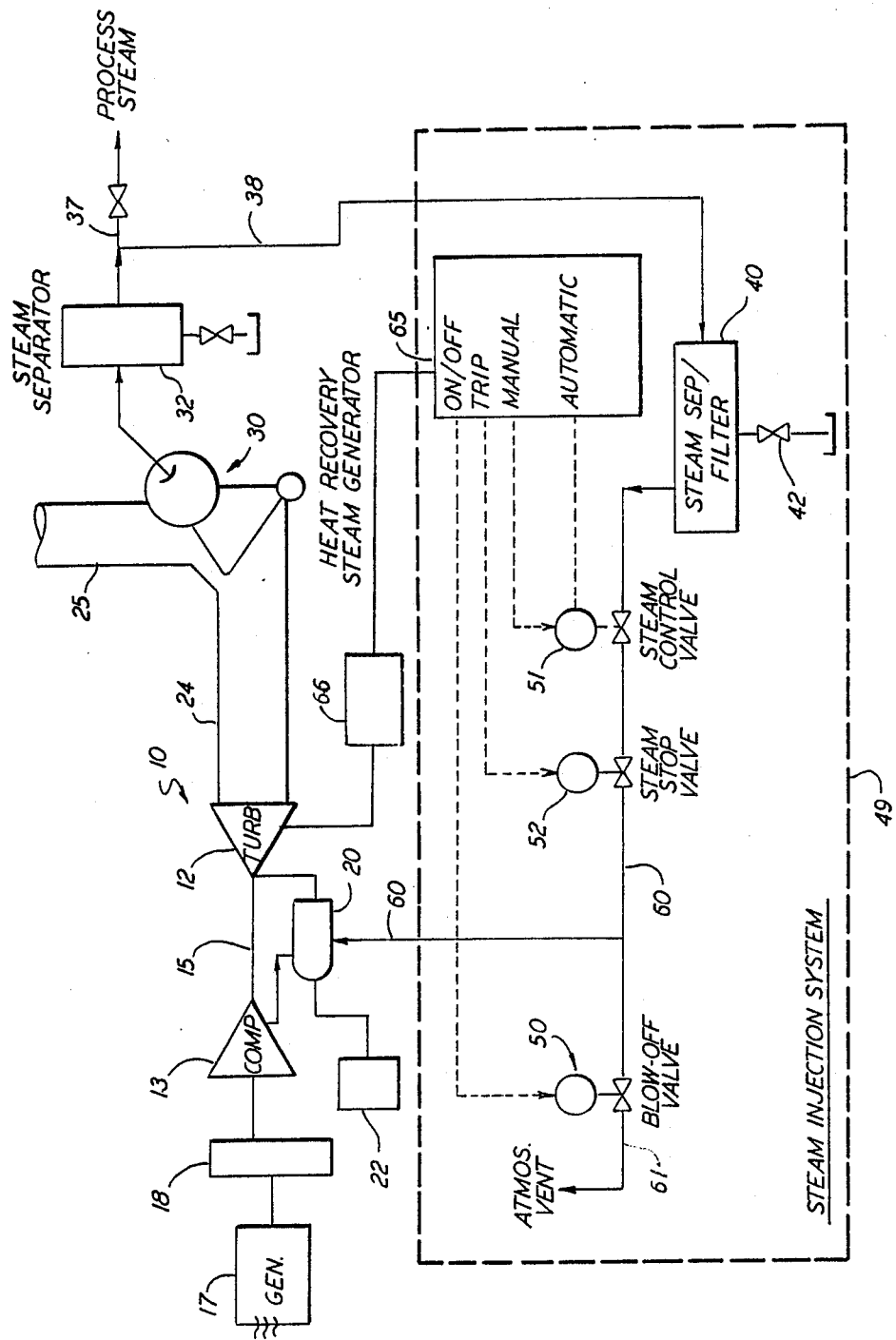

CONTROL METHOD FOR USE WITH STEAM INJECTED GAS TURBINE

This is a division of application Ser. No. 218,680, filed July 13, 1988 (U.S. Pat. No. 4,893,467).

BACKGROUND OF THE INVENTION

This invention relates to a steam injection system for use in a gas turbine engine and, in particular, to a steam injection control system for preventing unwanted moisture and solid particulates from being ingested into the gas turbine with the injected steam.

The value of injecting steam into a gas turbine engine for increasing the engine efficiency has been known for quite some time. A joint paper entitled Maximum Steam Injection in Gas Turbines was presented at the South Power Generation Conference in 1972 by W. H. Day and P. H. Kydd outlining some of the effects of controlled steam injection. Steam injection gas turbine engines have been developed for cogenerating both electrical energy and steam. The proper conditioning and control of the steam used for steam injection in a gas turbine is, however, difficult to obtain. Moisture can collect in the injection system along with particulates which are carried by the injected steam into the turbine. Dirt and moisture that are introduced into the engine can damage the rotating components of the machine. Also of concern is the danger posed by the continued injection of steam into the combustor in the event the gas turbine engine is tripped during an emergency shut down. Under these conditions, the turbine is allowed to coast down and the compressor bleed valves are opened.

Hamill et al in U.S. Pat. No. 4,597,256 describe a method of terminating the flow of injection steam to the combustor of a gas turbine. A complex counter flow heat exchanger unit is employed in this system for generating the injected steam which includes a superheater section, an evaporator section, and an economizer section. A valve is mounted between the superheater and evaporator sections which is closed at the end of the steam injection cycle, but prior to engine shut down. The engine is allowed to run for a short period of time after the steam flow has been terminated to insure that any steam that might be trapped in the injection line in front of the valve will be consumed and thus prevented from condensing inside the lines. The Hamill et al system, however, is incapable of protecting the engine from moisture or other contaminants during start up or emergency shut downs.

SUMMARY OF THE INVENTION

It is therefore an object of the present invention to improve gas turbine systems using steam injection.

It is a further object of the present invention to provide a simple control system for regulating the flow of injected steam to a gas turbine that will protect the engine at start up and during emergency shut downs.

It is yet another object of the present invention to prevent unwanted dirt and water from being injected with steam in a gas turbine engine.

Another object of the present invention is to prevent injected steam from bleeding back into the compressor of a gas turbine engine during an emergency shut down.

These and other objects of the present invention are attained in a gas turbine system having a steam supply for providing steam to the turbine combustor. Steam from the supply is treated to remove moisture and other contaminants from the supply and the treated steam is carried to the combustor by an injection line. A flow regulator is placed in the line at the steam entrance while a venting mechanism is placed in the line downstream from the flow regulator. The flow regulator contains an adjustable control valve for regulating the rate of steam flow through the injection line and also a stop valve that can be cycled to open and close the line. The venting mechanism includes a blow-off valve that can be selectively opened to vent the injection line to the atmosphere. A control unit sequences the valves to condition the injection line at the beginning and the end of each steam injection cycle to prevent moisture and other contaminants from entering the engine during normal operations. The control unit will also shut down the steam flow and vent the injection line when the turbine is tripped during an emergency shut down thus relieving the combustor and preventing additional stream from being delivered to the engine during this critical period.

BRIEF DESCRIPTION OF THE DRAWINGS

For a better understanding of these and other objects of the present invention references will be made to the following detailed description of the invention which is to read in conjunction with the drawing which is a schematic representation of a gas turbine cogeneration system utilizing the teachings of the present invention.

DESCRIPTION OF THE INVENTION

Referring now to the drawing there is shown a gas turbine-generator system 10 that is arranged to have excess steam produced by a waste heat boiler injected into the turbine combustor to increase the effective output of the system. The system includes a gas turbine 12 that is coupled to an axial compressor 13 by a shaft 15. The compressor, in turn, is coupled to an electrical generator 17 or any other appropriate load by a gear box 18 and suitable shafting. Hot gases for driving the turbine are generated in a combustor 20 that may contain one or more combustion chambers which are sometimes referred to as "cans". Fuel from a fuel supply 22 is metered into the combustor along with compressed air provided by the compressor. The fuel and air is mixed in a combustion chamber to develop a high temperature gas which is delivered into the turbine to drive its rotating components. As is well known in the art, the gas is expanded as it moves through the turbine stages whereby the energy in the gas is converted into mechanical work required to turn the turbine shaft 15.

The still hot gases discharged from the turbine exhaust are delivered into an exhaust duct 24 and conducted to the atmosphere via a stack 25. A waste heat boiler 30 of any suitable design is exposed to the exhaust gases and is arranged to convert the residual heat in the gases to steam. Because of the nature of the exhaust gases, the steam generated in the waste heat boiler may be in a saturated state. The wet or saturated steam drawn off the boiler is initially passed through a cyclone separator 32. Any moisture or water droplets entering the separator are removed from the steam by centrifugal force and dry steam discharged from the separator is delivered to a downstream processing station (not shown) via steamline 37.

A portion or all of the dried steam leaving the cyclone separator is diverted to a combination separator and filter unit 40 by line 38. Here the dry steam is passed through a series of screens that remove additional moisture from the steam as well as any fine particulates that might be entrained in the flow. A trap 42 serves to remove collected moisture and contaminants from the unit. Purified steam is discharged from the unit into an injection line 60 that is arranged to carry the steam to the combustor 20 of the turbine 12.

The use of steam injection in gas turbine engines such as the one herein described is known in the art. Energy supplied by the steam helps to improve turbine efficiency and increases the turbine output. It has also been found that injecting steam into the turbine combustor reduces the amount of nitrogen oxide produced in the turbine thus leading to cleaner stack emissions. Care, however, must be exercised to insure that the steam injected into the turbine is thoroughly dry and free from particulate materials which might erode or otherwise harm the exposed parts of the turbine. Separators and filters of the type described above go a long way toward preventing water slugs and dirt from being injected into the turbine along with the beneficial steam. However, it has been found that the treated steam, unless properly controlled, can pick up additional moisture and other contaminants as it is being piped from the separator unit or units to the turbine combustor.

Another heretofore ignored danger is posed by the steam injection system. This occurs when the turbine engine is forced to shut down under emergency conditions. Typically, when an emergency is sensed, the turbine is immediately tripped off line and allowed to coast to a stop and the bleed valves in the compressor are opened to relieve the pressure therein. As can be seen, the steam being injected into the combustor can now move back through the air lines into the compressor. Hot steam will, of course, cause extensive damage to any of the exposed compressor parts that it might contact.

In accordance with the present invention, the gas turbine engine is equipped with a system that regulates the injection of steam into the turbine at start up and during both a normal and an emergency shut down so as to protect the system from potential harm. The steam injection control system includes the previously noted steam separator 32 and the combination separator and filter unit 40 along with a blow-off valve 50, an adjustable steam control valve 51 and a stop valve 52. The control valve and the stop valve are mounted in series in the steam injection line 60 at the discharge of the separator and filter unit 40. The blow-off valve is mounted in a vent line 61 that is connected into the injection line downstream from the stop and control valve combination. Each of the valves is electrically controlled and is positionable in response to signals from a steam control unit show generally at 65. The control unit contains a microprocessor that can be programed to sequence the valves at the beginning and the end of each steam injection cycle or when the gas turbine system is subjected to an emergency shut down.

During start up of the gas turbine, the control unit closes all three valves 50–52 in the steam injection system and the turbine is brought up to speed using an air and fuel gas mixture. The injection line thus remains relatively cool during this period and, as a consequence, steam introduced into the line can condense as it is carried toward the turbine combustor. Prior to injecting steam into the combustor, a steam start up cycle is initiated during which time the injection piping is preheated and the piping is blown down to remove any dirt or other particulates that might have found its way into the piping. Upon the turbine reaching a desired operating speed, the control unit instructs the blow off valve to open whereupon a small quantity of compressed air is allowed to back flow through the injection line and is vented through vent line 61 to the atmosphere. This blows the injection line clean and heats the line sufficiently to prevent steam from condensing on the interior wall of the line.

During the preheating period, steam from the boiler is dead headed against the control valve 51. Any entrained moisture or other contaminants are collected in the separator and filter unit 40 and removed from the flow system by means of trap 42. After the blow-off valve has been opened for about ten minutes, the stop valve 52 is cycled to an open position. The control valve, however, remains closed. Because of the nature of most control valves, a certain amount of steam, however, is allowed to leak past the valve for a short period of time. The control valve is then slowly opened to about 10% of its fully opened capacity. The steam pressure in the injection line at this time is still less than the pressure in the back flow of compressor air and as a result, the steam is drawn through the vent line with the air flow. This further conditions the line between the vent line and the control valve.

The blow-off valve 50 automatically closes when control valve 51 opens to 10%. The control valve is then further opened according to either a manual or automatic schedule thus completing the start up purge cycle. The quantity of steam injected into the combustor can be automatically scheduled as a function of ambient temperature and the generator output power level.

A normal shut down of the steam injection cycle can be carried out automatically by the control unit 65. Initially, the control valve 51 is closed to reduce the steam flow through the injection line to zero whereupon the stop valve 52 is cycled closed. As soon as the stop valve closes, the blow-off valve 50 is opened for about 15 seconds for a second purge cycle. At the end of the period the blow-off valve is again closed terminating the steam injection cycle. An emergency shut down of the turbine engine typically occurs when some problem or malfunction is detected in either the turbine or the generator. Upon sensing an emergency, the engine controller, among other things, trips the turbine off line and opens the compressor bleed valves. As a consequence, steam being injected into the combustor can flow back from the combustor through the compressor and out the bleed valve thus doing considerable harm to the exposed compressor parts. A sensor 66 which is part of the overall steam injection control system, is arranged to detect when a faulty condition has occurred and sends a trip signal to the control unit 65. In response to a trip signal, the control unit instructs the stop valve to cycle closed and the blow-off valve to open. The control valve is also instructed to move to a closed position. The blow-off valve is held open for a sufficient period of time to prevent any steam trapped in the lines from flowing back to the compressor.

While this invention has been described with specific detail to the disclosure above, it is not necessarily limited to that description. Rather, any modifications and variations would present themselves to those skilled in the art without departing from the scope and spirit of this invention, as defined in the impending claims.

I claim:

1. A method of controlling the injection of steam into a combustor of a gas turbine system wherein the turbine is coupled to a compressor that provides air to the combustor, the method including the steps of conducting steam from a supply through an injection line to the turbine combustor, mounting a stop valve and a normally closed blow-off valve in said injection line so that the blow-off valve is downstream from the stop valve, cycling the stop valve to an open position at the beginning of a steam injection cycle and to a closed position at the end of said steam injection cycle, opening the blow-off valve for a predetermined period of time each time the stop valve is either cycled to an open or a closed position to purge the injection line at the beginning and the end of each steam injection cycle.

2. The method of claim 1 that includes the further steps of mounting an adjustable control valve in the injection line upstream from the stop valve, and partially opening the control valve when the injection line is being purged at the beginning of each steam injection cycle.

3. The method of claim 1 that includes the further steps of sensing when the turbine is tripped off line during an emergency shut down, and immediately closing the stop valve and opening the blow-off valve in response to sensing an emergency shut down.

4. The method of claim 1 that includes the further step of generating supply steam using heat from the turbine exhaust.

5. The method of claim 1 that includes the further step of removing moisture and particulates from the supply steam prior to delivering said steam to the combustor.

* * * * *